United States Patent
Schmidt (10) Patent No.: US 9,876,680 B2
(45) Date of Patent: Jan. 23, 2018

(54) ONE BUTTON CONFIGURATION OF EMBEDDED ELECTRONIC DEVICES

(71) Applicant: SCHNEIDER ELECTRIC IT CORPORATION, West Kingston, RI (US)

(72) Inventor: Michael Kenneth Schmidt, St. Charles, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 308 days.

(21) Appl. No.: 14/501,647

(22) Filed: Sep. 30, 2014

(65) Prior Publication Data

US 2016/0094382 A1    Mar. 31, 2016

(51) Int. Cl.
| | |
|---|---|
| *H04L 12/24* | (2006.01) |
| *G06F 3/0482* | (2013.01) |
| *G06F 3/0484* | (2013.01) |

(52) U.S. Cl.
CPC .......... *H04L 41/082* (2013.01); *G06F 3/0482* (2013.01); *G06F 3/04842* (2013.01); *H04L 41/0809* (2013.01); *H04L 41/0883* (2013.01); *Y04S 40/162* (2013.01)

(58) Field of Classification Search
CPC .......................... H04L 41/0883; H04L 41/082
See application file for complete search history.

(56) References Cited

U.S. PATENT DOCUMENTS

| | | | |
|---|---|---|---|
| 9,491,765 B1* | 11/2016 | Petrick ................ | H04B 7/0408 |
| 9,600,477 B2* | 3/2017 | Ashok .................... | G06F 17/30 |
| 9,747,286 B2* | 8/2017 | Ashok .................... | G06F 17/30 |
| 2006/0253693 A1* | 11/2006 | Kanodia ................ | G06F 8/61 |
| | | | 713/1 |
| 2012/0311127 A1* | 12/2012 | Kandula .............. | H04W 16/28 |
| | | | 709/224 |
| 2013/0031399 A1* | 1/2013 | Watson .................. | G06F 1/189 |
| | | | 713/340 |
| 2013/0198349 A1* | 8/2013 | Wright ............... | H04L 41/0883 |
| | | | 709/221 |
| 2013/0308493 A1* | 11/2013 | Viswanathan ........ | H04W 24/02 |
| | | | 370/254 |

(Continued)

OTHER PUBLICATIONS

Extended European Search Report from corresponding European Application No. 15186425.3 dated Mar. 3, 2016.

*Primary Examiner* — Jerry Dennison
(74) *Attorney, Agent, or Firm* — Lando & Anastasi, LLP (57) ABSTRACT

The present invention provides a system and method of configuring embedded electronic devices in a data center. The method includes: requesting device configuration information by the one or more embedded electronic devices via a wireless protocol; receiving the request at an update apparatus; in response to receiving the request at the update apparatus, retrieving a configuration file at the update apparatus, wherein the configuration file comprises a series of instructions for configuring the one or more embedded electronic devices in a default configuration; transmitting the configuration file from the update apparatus to the one or more embedded electronic devices via the wireless protocol; and configuring the one or more embedded electronic devices according to the configuration file.

17 Claims, 6 Drawing Sheets

(56) References Cited

U.S. PATENT DOCUMENTS

| | | | | |
|---|---|---|---|---|
| 2014/0012913 A1* | 1/2014 | Varoglu | .............. | H04L 41/0806 709/204 |
| 2014/0109094 A1* | 4/2014 | Datla | ........................ | G06F 9/46 718/100 |
| 2015/0222709 A1* | 8/2015 | Thielen | ................... | H04L 69/18 709/228 |
| 2015/0326437 A1* | 11/2015 | Shrestha | .............. | H04B 5/0025 709/222 |
| 2016/0094382 A1* | 3/2016 | Schmidt | ................ | H04L 41/082 715/735 |

\* cited by examiner

ONE BUTTON CONFIGURATION OF EMBEDDED ELECTRONIC DEVICES

TECHNICAL FIELD

The disclosure relates generally to embedded electronic devices in computing equipment, and in particular to configuration of said embedded electronic devices.

BACKGROUND

Embedded electronic devices, such as rack power distribution units, are increasing in popularity as a result of convenience and efficiency. Power distribution units typically split incoming power into a number of divisional circuits. For example, a rack power distribution unit is fitted with one or more outputs designed to distribute power to a computing asset. Rack power distribution units in a data center can vary from simple power strips to larger systems including filtering capabilities, load balancing techniques, and remote monitoring. Conventional installation of a rack power distribution unit includes physical installation of the unit and manual intervention to make the unit operable.

SUMMARY OF INVENTION

Aspects and embodiments as described herein are directed to methods and systems for configuring embedded electronic devices in a data center. In particular, some of these systems and methods include utilization of a wireless protocol to wirelessly configure the embedded electronic devices.

According to one embodiment, there is provided a method of configuring an embedded electronic device in a data center including, requesting device configuration information by the one or more embedded electronic devices via a wireless protocol, receiving the request at an update apparatus, in response to receiving the request at the update apparatus, retrieving a configuration file at the update apparatus, wherein the configuration file comprises a series of instructions for configuring the one or more embedded electronic devices in a default configuration, transmitting the configuration file from the update apparatus to the one or more embedded electronic devices via the wireless protocol, and configuring the one or more embedded electronic devices according to the configuration file.

In another embodiment, the method may include prompting a user of the update apparatus to initiate configuration of the one or more embedded electronic devices through activation of a one-touch button prior to retrieving a configuration file. In yet another embodiment, the wireless protocol may be used to implement a short range piconet. In another embodiment, the method may include ascertaining a current configuration status in response to activating the one or more embedded electronic devices. In another embodiment, the method may include notifying the user of the update apparatus that the one or more embedded electronic devices have been activated, in response to activating the one or more embedded electronic devices.

In another embodiment, the method may include updating the configuration file with intrinsic data, wherein the intrinsic data includes information reported by the one or more embedded electronic devices. In yet another embodiment, the method may include updating the configuration file at the update apparatus with neighboring device data from another embedded electronic device prior to transmitting the configuration file from the update apparatus to the one or more embedded electronic devices via the wireless protocol. In another embodiment, the method may include updating the configuration file at the update apparatus with user selected network data prior to transmitting the configuration file from the update apparatus to the one or more embedded electronic devices via the wireless protocol, wherein updating the configuration file at the update apparatus with user selected network data includes: providing the user with, via the update apparatus, a list of network devices for selection, and retrieving user selected network data in response to user selection of a network device.

According to one embodiment, there is provided a system for configuring an embedded electronic device in a data center including, an update apparatus comprising a communication interface for communication via a wireless protocol, and one or more components executable by the update apparatus and collectively configured to: receive a device configuration request via the wireless protocol, in response to receiving the device configuration request, retrieve a configuration file, wherein the configuration file comprises a series of instructions for configuring a first embedded electronic device in a default configuration, and transmit the configuration file to the first embedded electronic device.

In another embodiment, the update apparatus may include a mobile computing device. In yet another embodiment, the system may include a first embedded electronic device including a wireless component configured to request device configuration via the wireless protocol and receive the configuration file via the wireless protocol.

In another embodiment, the one or more components may be collectively configured to: update the configuration file with intrinsic data, wherein the intrinsic data includes information self-described by the first embedded electronic device. In another embodiment, the system may include at least a second embedded electronic device. In yet another embodiment, the one or more components may be collectively configured to: update the configuration file with neighboring device data from the at least one second embedded electronic device prior to transmitting the configuration file from the update apparatus to the first embedded electronic device via the wireless protocol. In another embodiment, the one or more components may be collectively configured to: prompt a user of the update apparatus to initiate configuration of the first embedded electronic device through activation of a one-touch button prior to retrieving the configuration file at the update apparatus.

According to one embodiment, there is provided a system including a power distribution unit including, a unit housing; a power input configured to receive power from an external source; at least one power output configured to couple to a computing asset to deliver power to the computing asset, and a wireless component, wherein the wireless component is configured to: request device configuration information via a wireless protocol, in response to activation of the power distribution unit, and receive a configuration file via the wireless protocol, wherein the configuration file comprises a series of instructions for configuring the first embedded electronic device to a default configuration.

In another embodiment, the power distribution unit may include a rack power distribution unit. In another embodiment, the wireless component may be configured to retrieve and transmit intrinsic data in response to an intrinsic data request, wherein intrinsic data includes information self-described by the power distribution unit. In yet another embodiment, the system may include an update apparatus, wherein the wireless component is further configured to receive the configuration file via the wireless protocol from the update apparatus. In another embodiment, the update apparatus may include a machine learning process and is configured to update the configuration file with the intrinsic data.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure.

DETAILED DESCRIPTION

Conventional configuration of embedded electronic devices in a data center requires manual intervention. For example, when installing a rack power distribution unit (RDPU), the installer must first physically install the RDPU, physically connect the network port, repeatedly press a button to locate the RDPU IP address, and enter the IP address into the address of a web browser. This process can be arduous and especially time consuming when it must be repeated for more than one embedded electronic device. Other devices having network management cards (NMCs) must go through a similar process.

The present disclosure provides a system and method for configuring one or more of a plurality of embedded electronic devices in a data center via a wireless protocol.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1A:
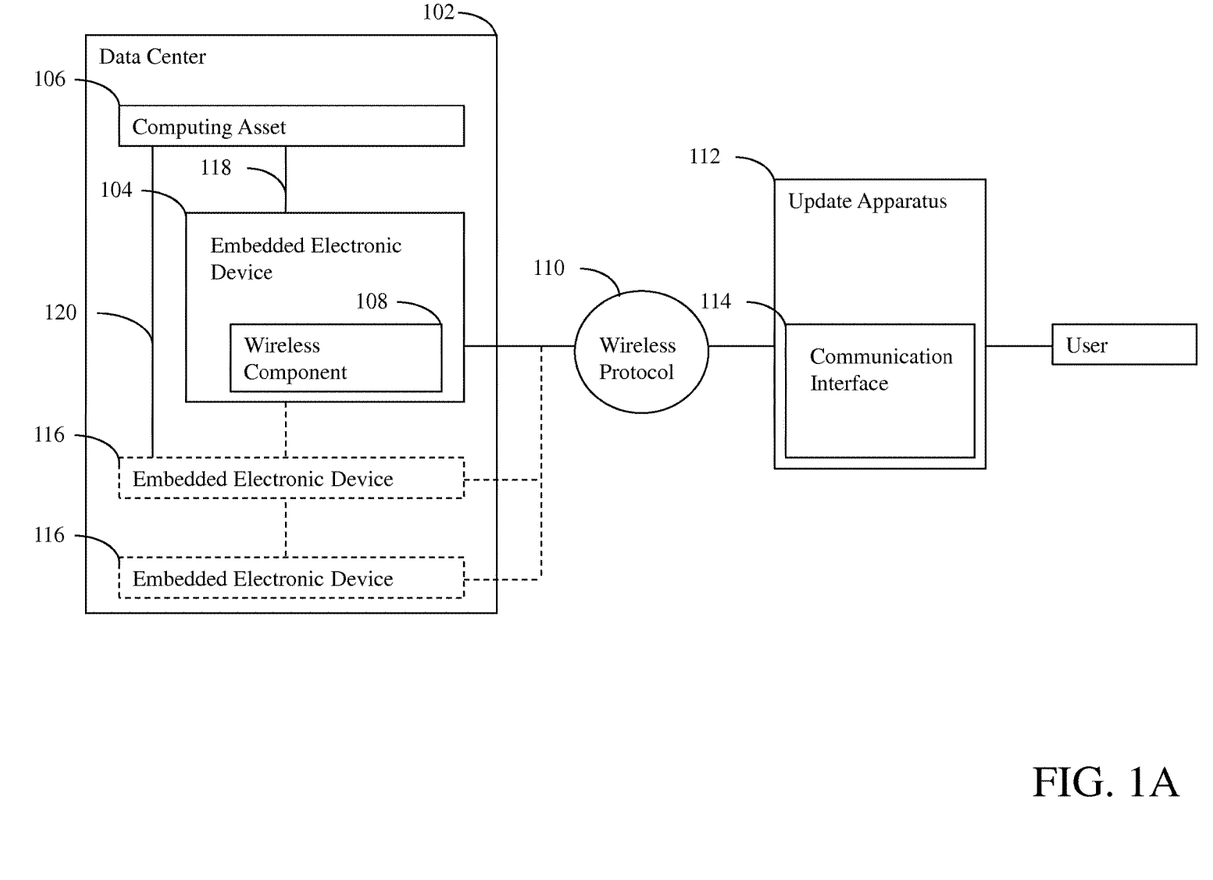
FIG. 1A shows an exemplary embodiment of a system for configuring an embedded electronic device in a data center.

Referring to FIG. 1A, an exemplary embodiment of a system for configuring an embedded electronic device in a data center is shown. As shown in FIG. 1A, a data center 102 includes a computing asset 106, an embedded electronic device 104, optional embedded electronic devices 116, and an upgrade apparatus 112. The embedded electronic device 104 includes a wireless component 108. The upgrade apparatus 112 includes a communication interface 114.

In one embodiment illustrated by FIG. 1A, the computing asset 106 is coupled to the embedded electronic device 104 via a connector 118. The connector 118 may include power and/or data connections, such as wiring, cabling, and the like. The computing asset 106 is also coupled to the optional embedded electronic devices 116 via one or more connectors 120.

In another embodiment illustrated by FIG. 1A, the wireless component 108 exchanges (i.e., transmits or receives) data with the communication interface 114 via the wireless protocol 110. As shown in FIG. 1A, the optional embedded electronic devices 116 are also in data communication with the update apparatus 112 via the wireless protocol 110.

Figure 1B:
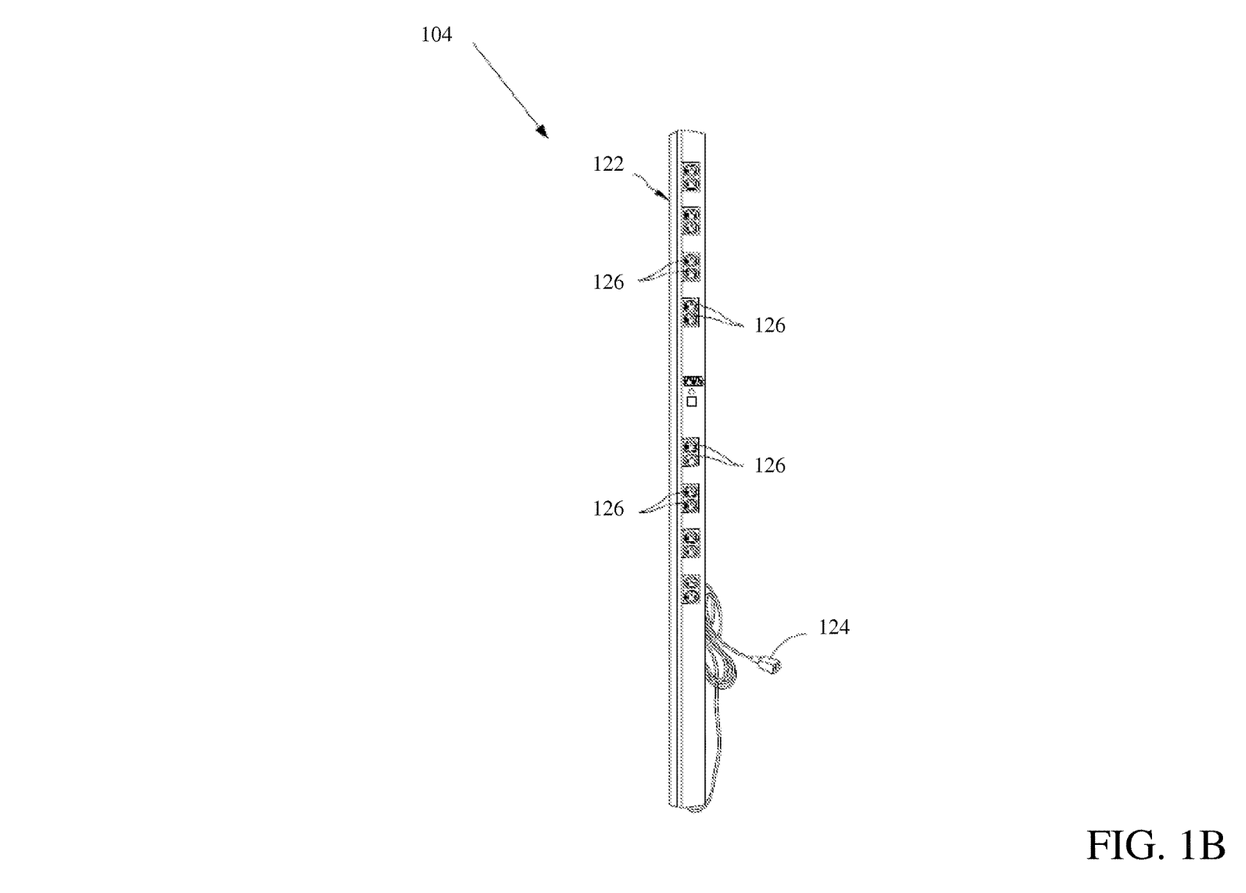
FIG. 1B shows an exemplary embodiment of a power distribution unit.

In varying embodiments, the embedded electronic device 104 includes any power distribution unit (e.g. a rack power distribution unit) that distributes electrical power to a computing asset 106 in a data center 102. With continuing reference to FIG. 1A, FIG. 1B shows a rack power distribution unit according to various embodiments. The power distribution unit is configured to receive power from a distribution line at a power input 124, and couple the distribution line to the computing asset 106 at a power output 126. As shown in FIG. 1B, the power distribution unit 104 can include a plurality of power outputs 126. In varying embodiments, the power input 124 and/or output 126 is disposed on the exterior of a housing or chassis 122. In additional embodiments, the power distribution unit may also include circuitry to configure received power into a form more suitable for the computing assets. In some examples, the power distribution unit can include a transformer or power converter.

Turning back to FIG. 1A, in varying embodiments, the embedded electronic device 104 includes a wireless component 108 having hardware and software configured to perform acts as described herein via a wireless protocol 110 such as BLUETOOTH®, Bluetooth Low Energy (BLE), WiFi, Zigbee, or Propriety Radio. As used herein, BLUETOOTH® refers to a short range ad hoc network, otherwise known as piconets. BLUETOOTH® operates in the spectrum band of 2.4 to 2.485 GHz. In particular, BLE offers the benefit of reduced power consumption and cost. In various embodiments, BLE communication is structured as a series of "services" composed of "characteristics". In further embodiments, the wireless component 108 may include hardware and software to support both BLUETOOTH® and Bluetooth Low Energy.

According to additional embodiments, the data center 102 can include one or more embedded electronic devices in communication (e.g., embedded electronic devices 116). For example, in a data center having a first and a second embedded electronic device, the first device can include a network drop wherein the second device can connect to the first device via a private network. The first device acts as a master device or node, which stores a routing table of links between the first device and other slave devices or nodes (e.g., the second electronic device).

One or more embedded electronic devices 104 implemented as power distribution units can be mounted in a rack or cabinet of a computing asset 106 to provide power specific to the computing asset's 106 demands. The single computing asset 106 can be configured to receive power from the first device through a first input (Connector A) 118, and power from the second device through a second input (Connector B) 120. Power input to the computing asset 106 can be controlled and handled by switching between power inputs of the computing asset 106. The computing asset 106 configured in this manner enables response to undesirable power conditions such failure of upstream power at the first input.

As discussed herein, the computing asset 106 can include any device using power supplied by the one or more embedded electronic devices. For example, the computing asset 106 may include a server for providing network services for a plurality of computing devices.

With continuing reference to FIG. 1A, the system can further include the update apparatus 112. As used herein, the update apparatus 112 can include any electronic device connected to other devices or networks via the wireless protocol 110, such as those described herein. Various aspects and functions described herein may be implemented as specialized hardware or software components executing in one or more update apparatuses. Examples of the update apparatus 112 may include: smart phones, tablet computers, and personal digital assistants. Examples of particular models of mobile computing devices include iPhones, iPads, and iPod touches running iOS operating system available from Apple, Android devices like Samsung Galaxy Series, LG Nexus, and Motorola Droid X, Blackberry devices available from Blackberry Limited, and Windows Phone devices.

The update apparatus 112 also includes one or more interface devices such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the update apparatus to exchange information and to communicate with external entities, such as users and other systems. For example, the update apparatus 112 may include a communication interface 114 configured to receive data via the wireless protocol.

Figure 2:
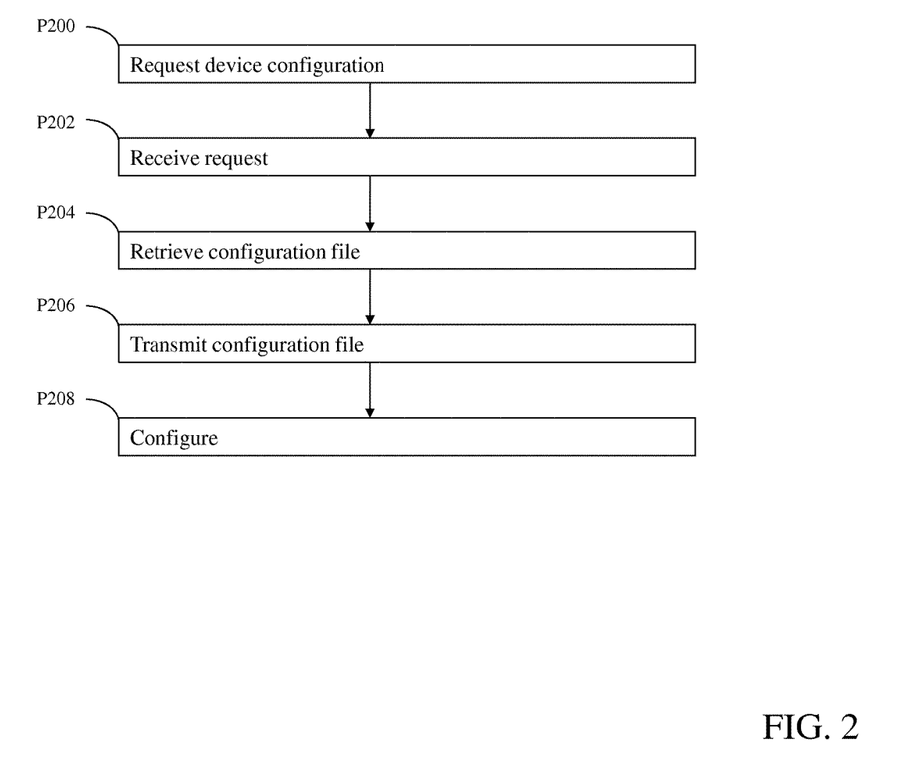
FIG. 2 illustrates a flow diagram of the method for configuring an embedded electronic device via a wireless protocol.

Referring to FIG. 2, a method for configuring a plurality of embedded electronic devices, such as embedded electronic device 104 described above with reference to FIG. 1, in a data center via a wireless protocol (e.g., wireless protocol 110 in FIG. 1A) is shown. According to varying embodiments, the method can include:

P200: Requesting device configuration at a first of a plurality of embedded electronic devices via a wireless protocol. Configuration, as used herein, refers to any change in the current state of the embedded electronic device. For example, configuration can include any or all of: assigning warning or alarm recipients, assigning thresholds for power based warning alerts, assigning thresholds for temperature based warning alerts, assigning upload log recipients, assigning a device location, and ascertaining device connections schemes.

As described above, the embedded electronic device includes a wireless component, such as wireless component 108, having hardware and software configured to request device configuration via a wireless protocol such as BLUETOOTH®, Bluetooth Low Energy (BLE), WiFi, Zigbee, or Propriety Radio. In various embodiments, BLE communication is structured as a series of "services" composed of "characteristics." In one embodiment, the embedded electronic device may have a service for requesting configuration. According to this embodiment, this service contains a characteristic which acts as a serial port to allow a configuration file to be transferred to the embedded device. In further embodiments, the wireless component may include hardware and software to support both BLUETOOTH® and Bluetooth Low Energy.

P202: Receiving the request at an update apparatus. In varying embodiments, the update apparatus, for example update apparatus 112 as discussed with reference to FIG. 1A, can include any electronic device connected to other devices or networks via a wireless protocol, such as those described herein. The update apparatus also includes one or more interface devices such as input devices, output devices and combination input/output devices. For example, the apparatus may include a communication interface (e.g., communication interface 114 shown in FIG. 1A) configured to receive data via the wireless protocol.

P204: In response to receiving the request at the update apparatus, retrieving a configuration file at the update apparatus, wherein the configuration file comprises a series of instructions for configuring the first of a plurality of embedded electronic devices in a default configuration. In an embodiment where the update apparatus is a smart phone or tablet, this state is reached by installation and operation of a client application. For example, receipt of a request to configure the embedded electronic device activates a configuration application running in the background of the smart phone or tablet. Once the update apparatus receives the request, the application initiates and retrieves a configuration file.

As described herein, a configuration file can contain instructions for hardware or software components. For example, a configuration file can include information regarding any or all of: warning alarm recipients, thresholds or levels for power level warning alerts, thresholds or levels for temperature based warning alerts, upload log recipients, device location, and device connections schemes. In an embodiment, the default configuration includes a base template for configuring the embedded electronic device. For example, a default configuration may be universal for all devices in a data center, or unique to a device's location.

In varying embodiments, the update apparatus further includes local history data regarding the embedded electronic device. Such data can include, for example, the configuration history of the embedded electronic device or the configuration history of neighboring embedded electronic devices. In particular, local history data can include a location field, which includes row and rack numbers.

According to an embodiment wherein a data center includes a plurality of embedded electronic devices, row and rack numbers correspond to the position of an embedded electronic device relative to the position of others. For example, when a first embedded electronic device in a line of devices is activated and configured, the update apparatus can retain the configuration history of that updated device. Subsequently, when a second embedded electronic device in the line of devices is activated, the update apparatus can iterate indicators of the physical location of the second device based on the configuration history of the previously configured device.

In one embodiment the saved configuration file is in JavaScript Object Notation (JSON) format. In further embodiments, the configuration file is in INI, XML, or a database.

P206: Transmitting the configuration file from the update apparatus to one or more embedded electronic devices via the wireless protocol. As discussed herein, the wireless protocol may include BLUETOOTH®, Bluetooth Low Energy (BLE), WiFi, Zigbee, or Propriety Radio.

P208: Configuring the one or more embedded electronic device according to the configuration file by applying configuration information specified in the configuration file to one or more operational parameters of the first embedded electronic device. This application of the configuration information may include altering values of the operational parameters. Once the embedded electronic device receives the configuration file from the update apparatus, it loads the data, and switches to normal operation mode. In an embodiment operation mode may include announcing wireless services.

Figure 3:
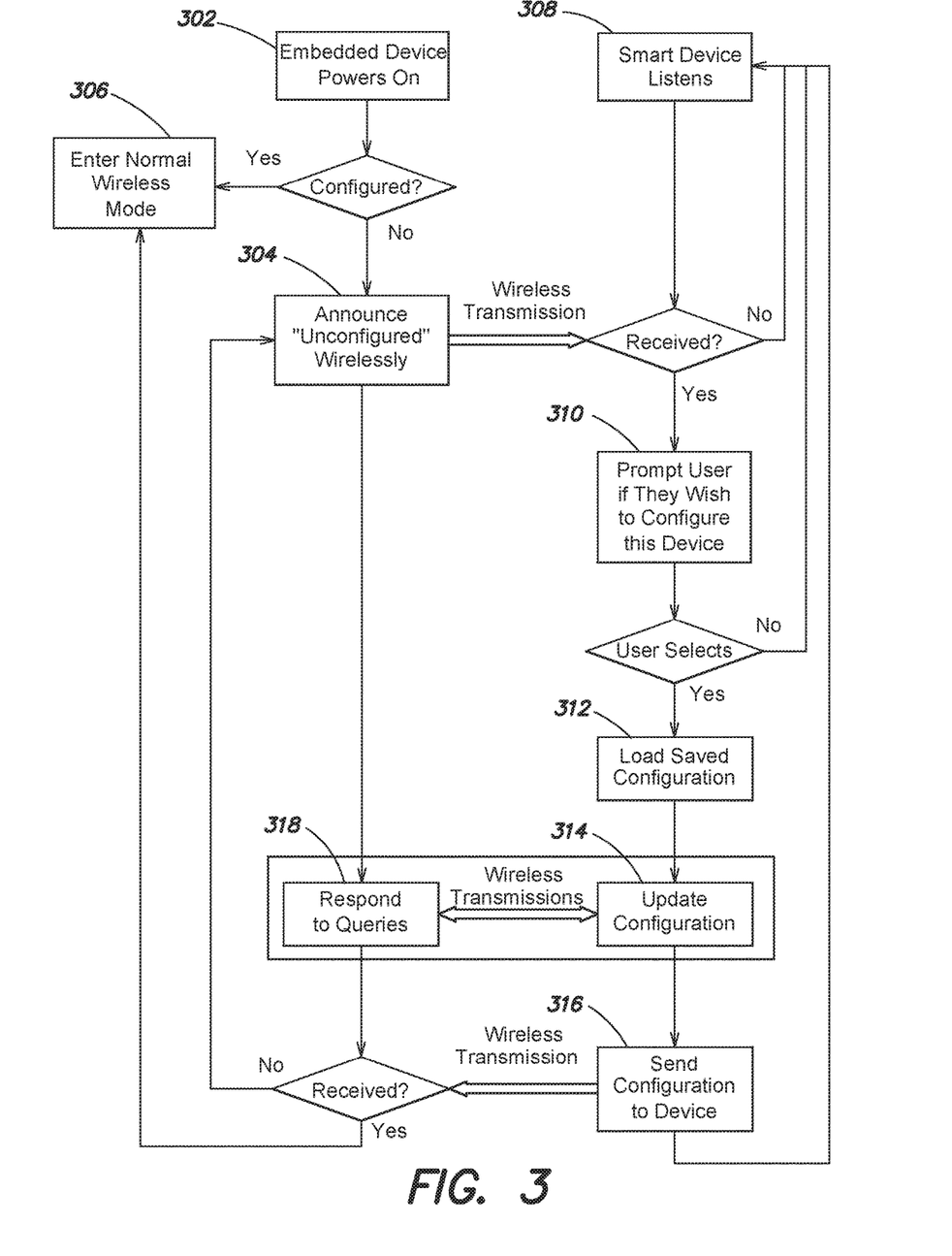
FIG. 3 illustrates an expanded flow diagram of the method for configuring an embedded electronic device via a wireless protocol.

FIG. 3 provides an additional exemplary embodiment of a method of configuring a plurality of embedded electronic devices in a data center via a wireless protocol.

In act 302, the embedded electronic device is activated (e.g., powered) for the first time. Activation can be achieved through manual or remote means. In response to activation, the embedded electronic device immediately ascertains the current configuration status of the device. In varying embodiments, this can include checking to see if the device has been previously configured, or if any base data has been changed. For example, the device can investigate whether the administer password has changed or if a manufacturing/rest-to-defaults flag is still set. If the embedded electronic device ascertains that it has been configured properly, it proceeds to a normal operation mode (act 306). As described herein, normal operation mode may include announcing wireless services.

In act 304, the embedded electronic device requests device configuration (i.e. announce "unconfigured" wirelessly) in response to ascertaining that it has not been configured. As discussed herein, the embedded electronic device can include a wireless component having hardware and software configured to send the request for device configuration via a wireless protocol such as BLUETOOTH®, Bluetooth Low Energy (BLE), WiFi, Zigbee, or Propriety Radio.

In act 308, the update apparatus monitors one or more wireless frequencies for requests for configuration from the embedded electronic device. In varying embodiments, the update apparatus can listen continuously, at discrete moments, or in predetermined intervals. As described herein, in an embodiment where the update apparatus is a smart phone or mobile tablet, this state is achieved by installing a client application. Once the update apparatus receives a request, the application executes and notifies the user of the update apparatus that an embedded electronic device has been activated and requests device configuration. If the application is concurrently running when the embedded electronic device requests configuration, the application immediate presents the user with a prompt asking if they wish to configure the activated embedded electronic device (act 310). In varying embodiments, the prompt can include a one-touch button that enables the user to proceed with retrieving a configuration file at the update apparatus in response to selection of the one-touch-button (act 312). If the user selects not to proceed with retrieving a configuration file, the update apparatus resumes listening for requests for configuration (act 308).

In act 314, the update apparatus updates the configuration file (discussed in more detail below). In an embodiment, the update apparatus uses the local history data and the default configuration data to update the configuration file. The process for updating the configuration file may be as complex as a machine learning process, or as simple as a fixed priority hierarchy. For example, the update apparatus can compare a configuration request with local history data and determine what configuration items have changed. In this manner, the update apparatus can determine the previous activities conducted by the user via the update apparatus and thereby predict future activities.

Once the update apparatus has completed updating the configuration file, the updated configuration file is sent to the embedded electronic device via the wireless protocol (act 316). Once the embedded electronic device receives the configuration file from the update apparatus, it loads the data, and switches to normal operation mode (act 306).

Figure 4:
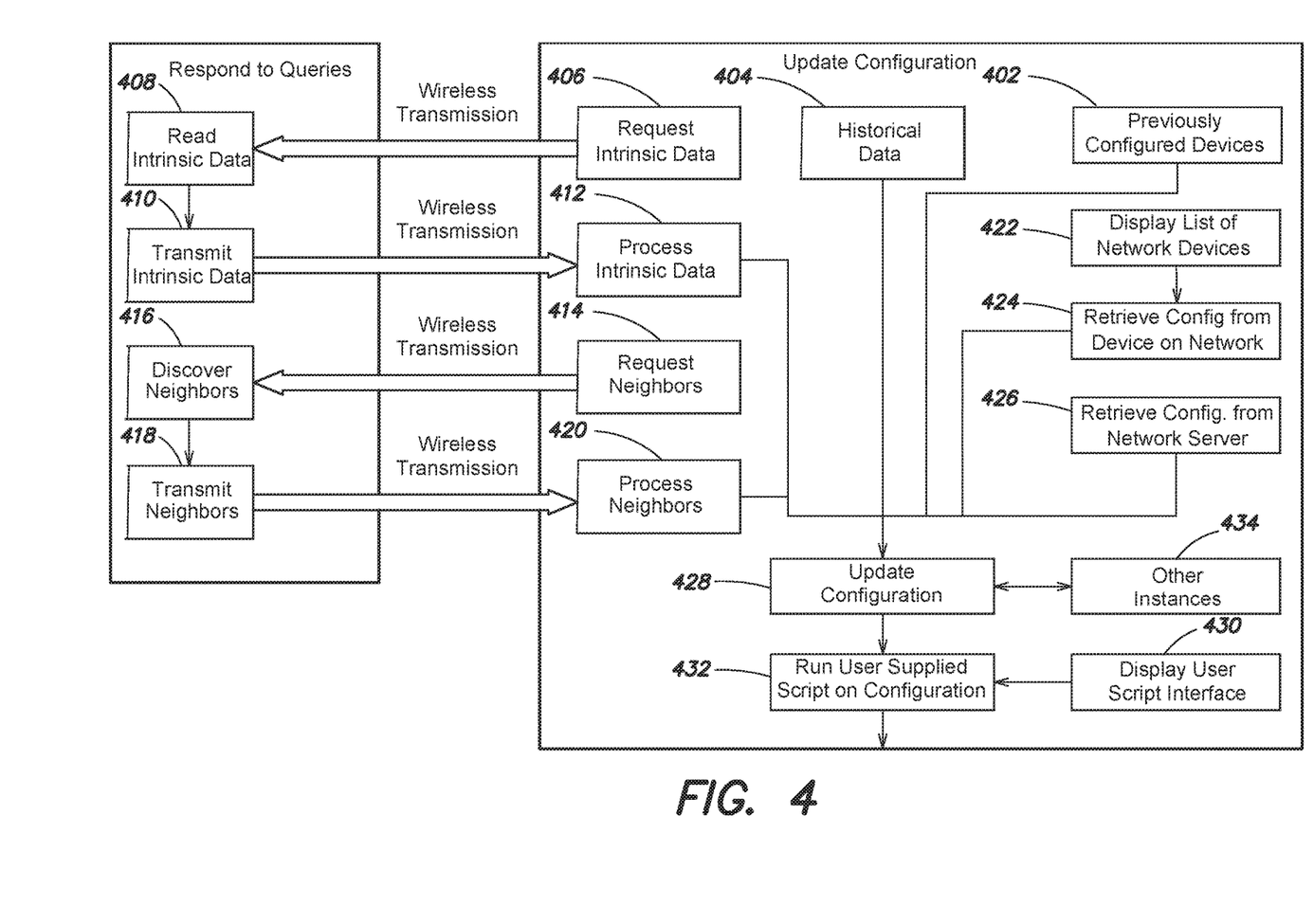
FIG. 4 provides an additional exemplary embodiment of a method for updating a configuration file.

FIG. 4 provides an additional exemplary embodiment of a method for updating a configuration file.

In varying embodiments, after retrieving the configuration file in the update apparatus, the method can further include processing local history data for the embedded electronic device (act 402). The method can further include processing local history data for at least two other embedded electronic devices. As discussed herein, the update apparatus can include local history data for the embedded electronic device or at least two other embedded electronic devices. Assuming that local history data for at least two other devices has been processed, the data can be used in a machine learning process to determine what the update apparatus user intends to configure. As discussed herein, this can include a location field, which can include row and rack numbers. If not enough data is available, the update apparatus can further retrieve historical user data to make an educated guess for the end user (act 404).

In act 406 the update apparatus begins an update process by querying the embedded electronic device for intrinsic data. This can be done, for example, via the wireless protocol. Intrinsic data includes any information that an embedded electronic device can determine about itself and its environment. For example, for a RPDU, this may mean the location of the device in the rack. Taken in conjunction with the local history data, this can allow the update apparatus to determine whether it is configuring a first embedded electronic device in a data center or a second embedded electronic device in the data center, thus simplifying the configuration. In response to receiving the query from the update apparatus, the embedded electronic device retrieves the intrinsic data and sends it via the wireless protocol (shown as acts 408 and 410). In varying embodiments, in response to collecting the intrinsic data from the embedded electronic device, the update apparatus can further process the data before updating the configuration file (act 412).

In varying embodiments, the method as described in FIG. 4 can further include act 414. In act 414, the update apparatus queries neighboring devices for neighboring device data. This can be done, for example, via the wireless protocol. As used herein, neighboring device data can include but is not limited to any information that a neighboring device can deduce about itself and its environment. In response to receiving a query from the update apparatus, neighboring devices collect neighboring data and send it via the wireless protocol (acts 416 and 418). According to one embodiment, neighboring devices include additional embedded electronic devices in functional proximity as determined by model to the embedded electronic device to be configured. In still further embodiments the neighboring electronic devices can include rack power distribution units. In response to collecting the intrinsic data from the neighboring devices, the update apparatus can further process the data before updating the configuration file (act 420).

For cases where not enough data is available for the update apparatus to make an intelligent decision regarding updating the configuration file, the update apparatus can present the user with a list of network devices which are similar to the embedded electronic device (act 422). After the user selects one or more devices in the list of network devices, the update apparatus then contacts these devices and retrieves the configuration information from them via the wireless protocol (424).

In further embodiments, the data center can further include a central monitoring authority. As provided in act 426, the central monitoring authority may be used to assist in providing data to update the configuration file. For example, the central monitoring authority can include a Schneider Electric StruxureWare Data Center Expert. In various embodiments, the central monitoring authority is interconnected, and may exchange data through a communication network with the embedded electronic device and or the update apparatus. This network may include any communication network through which computer systems may exchange data. In an embodiment, for example, the communication network is a wireless protocol. The central monitoring authority can include a processor, a memory, an interconnection mechanism, an interface, and a data storage element. The processor may be any type of processor, multiprocessor or controller. The memory stores programs and data during the operation of the central monitoring authority. As such, the memory may be a relatively high performance, volatile, random access memory such as dynamic random access memory (DRAM) or static memory (SRAM). However, the memory may include any device for storing data, such as a disk drive or other nonvolatile storage devices. The central monitoring authority may also include one or more interface devices such as input devices, output devices, or combination input/output devices. Interface devices may receive input or provide output.

In still further embodiments, the update apparatus may collect configuration relative data from an outside source. For example, if a third party provides a HTML file with embedded JavaScript, third party fields can be accessed and posted to any external web endpoint. This would be useful, for instance, in recording the device's embedded electronic device's serial number.

In act 428 the update apparatus updates the configuration file according to data obtained from, but not limited to, acts 402, 404, 406, 414, 422, 426, 430, and 434. In additional embodiments, the update apparatus updates the configuration file according to only one, or only a few of the acts discussed above. As discussed herein, the process for updating the configuration file may be as complex as a machine learning process, or as simple as a fixed priority hierarchy. In further embodiments, a custom configuration script can be run on the configuration file before it is transmitted to the embedded electronic device (act 432). A custom configuration file allows a user of the update device to predetermine a customized configuration option for the embedded electronic device (act 430).

FIG. 4 shows an example embodiment of a method for configuring a single embedded electronic device. In additional embodiments, the method as shown in FIG. 4 is implemented concurrently to configure multiple embedded electronic devices at the same time. This is shown as act 434. The first configuration file runs through the described acts herein, and communicates the data retrieved from one, some, or all of acts 402, 404, 406, 414, 422, and 426. As such, configuration of the second or third embedded electronic device only requires updating the data received from the first configuration file, receiving the updated data at the second or third embedded electronic device, and uploading that data.

Some embodiments disclosed herein implement a system for configuring an embedded electronic device in a data center via a wireless protocol using an update apparatus. In particular, the update apparatus can include a communication interface for communication via the wireless protocol. The system can further include one or more components executable by the update apparatus and collectively configured to receive device configuration requests, retrieve configuration files, and transmit configuration files. The update apparatus may include a smart device such as a smart phone, tablet computer, or personal digital assistant.

In further embodiments the update apparatus can include a computer. There are many examples of computer systems that are currently in use. These examples include, among others, network appliances, personal computers, workstations, mainframes, networked clients, servers, media servers, application servers, database servers, and web servers. Further, aspects may be located on a single update apparatus system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 5:
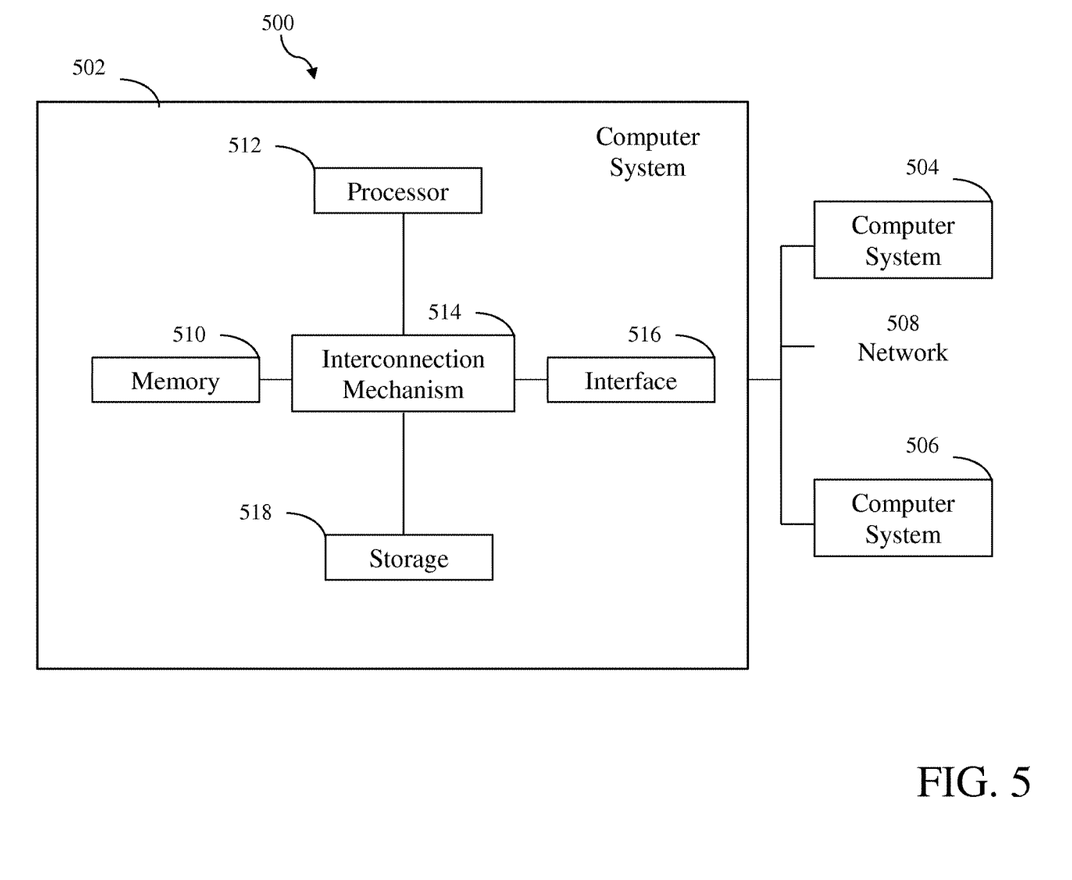
FIG. 5 shows a schematic diagram of a computer system as described herein.

Referring to FIG. 5, there is illustrated a block diagram of a distributed computer system 500, in which various aspects and functions are practiced. As shown, the distributed computer system 500 includes one or more computer systems that exchange information. More specifically, the distributed computer system 500 includes computer systems 502, 504, and 506. As shown, the computer systems 502, 504, and 506 are interconnected by, and may exchange data through, a communication network 508. The network 508 may include any communication network through which computer systems may exchange data. To exchange data using the network 508, the computer systems 502, 504, and 506 and the network 508 may use various methods, protocols and standards, including, among others, Fibre Channel, Token Ring, Ethernet, Wireless Ethernet, BLUETOOTH®, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 502, 504, and 506 may transmit data via the network 508 using a variety of security measures including, for example, SSL or VPN technologies. While the distributed computer system 500 illustrates three networked computer systems, the distributed computer system 500 is not so limited and may include any number of computer systems and computing devices, networked using any medium and communication protocol.

As illustrated in FIG. 5, the computer system 502 includes a processor 510, a memory 512, an interconnection element 514, an interface 516 and data storage element 518. To implement at least some of the aspects, functions, and processes disclosed herein, the processor 510 performs a series of instructions that result in manipulated data. The processor 510 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 510 is connected to other system components, including one or more memory devices 512, by the interconnection element 514.

The memory 512 stores programs (e.g., sequences of instructions coded to be executable by the processor 510) and data during operation of the computer system 502. Thus, the memory 512 may be a relatively high performance, volatile, random access memory such as a dynamic random access memory ("DRAM") or static memory ("SRAM"). However, the memory 512 may include any device for storing data, such as a disk drive or other nonvolatile storage device. Various examples may organize the memory 512 into particularized and, in some cases, unique structures to perform the functions disclosed herein. These data structures may be sized and organized to store values for particular data and types of data.

Components of the computer system 502 are coupled by an interconnection element such as the interconnection element 514. The interconnection element 514 may include any communication coupling between system components such as one or more physical busses in conformance with specialized or standard computing bus technologies such as IDE, SCSI, PCI and InfiniBand. The interconnection element 514 enables communications, including instructions and data, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 502 to exchange information and to communicate with external entities, such as users and other systems.

The data storage element 518 includes a computer readable and writeable nonvolatile, or non-transitory, data storage medium in which instructions are stored that define a program or other object that is executed by the processor 510. The data storage element 518 also may include information that is recorded, on or in, the medium, and that is processed by the processor 510 during execution of the program. More specifically, the information may be stored in one or more data structures specifically configured to conserve storage space or increase data exchange performance. The instructions may be persistently stored as encoded signals, and the instructions may cause the processor 510 to perform any of the functions described herein. The medium may, for example, be optical disk, magnetic disk or flash memory, among others. In operation, the processor 510 or some other controller causes data to be read from the nonvolatile recording medium into another memory, such as the memory 512, that allows for faster access to the information by the processor 510 than does the storage medium included in the data storage element 518. The memory may be located in the data storage element 518 or in the memory 512, however, the processor 510 manipulates the data within the memory, and then copies the data to the storage medium associated with the data storage element 518 after processing is completed. A variety of components may manage data movement between the storage medium and other memory elements and examples are not limited to particular data management components. Further, examples are not limited to a particular memory system or data storage system.

Although the computer system 502 is shown by way of example as one type of computer system upon which various aspects and functions may be practiced, aspects and functions are not limited to being implemented on the computer system 502 as shown in FIG. 5. Various aspects and functions may be practiced on one or more computers having a different architectures or components than that shown in FIG. 5. For instance, the computer system 502 may include specially programmed, special-purpose hardware, such as an application-specific integrated circuit ("ASIC") tailored to perform a particular operation disclosed herein. While another example may perform the same operation using a grid of several general-purpose computing devices running MAC OS System X with Intel processors and several specialized computing devices running proprietary hardware and operating systems.

The computer system 502 may be a computer system including an operating system that manages at least a portion of the hardware elements included in the computer system 502. In some examples, a processor or controller, such as the processor 510, executes an operating system. Examples of a particular operating system that may be executed include a Windows-based operating system, such as, Windows NT, Windows 5000 (Windows ME), Windows XP, Windows Vista, Windows Phone, or Windows 7 operating systems, available from the Microsoft Corporation, Android operating system available from Google, Blackberry operating system available from Blackberry Limited, a MAC OS System X operating system or an iOS operating system available from Apple, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Ruby, Objective-C, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

According to various embodiments, the methods as shown in FIGS. 1-3 may be implemented such that several configurations are running concurrently. Separate configurations may share data such as local history data in updating respective configuration files. As such, a plurality of embedded electronic devices can be configured more efficiently and speedily.

The methods as depicted in FIGS. 2-4 and as discussed herein each depict one particular sequence of acts in a particular embodiment. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, specially configured machines, namely a coverage analytics system configured according to the examples and embodiments disclosed herein.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of configuring one or more rack power distribution units in a data center comprising:
   requesting device configuration information by the one or more rack power distribution units via a wireless protocol;
   receiving the request at an update apparatus;
   in response to receiving the request at the update apparatus, retrieving a configuration file at the update apparatus, wherein the configuration file comprises a series of instructions for configuring the one or more rack power distribution units in a default configuration;
   receiving by the update apparatus, via the wireless protocol, neighboring device data for neighboring rack power distribution units and updating a location field of the configuration file based on a configuration history of the neighboring rack power distribution units with the update apparatus, with a machine learning process, wherein the location field includes row and rack numbers that indicate a position of the one or more rack power distribution units relative to a position of the neighboring rack power distribution units;
   transmitting the configuration file from the update apparatus to the one or more rack power distribution units via the wireless protocol; and
   configuring the one or more rack power distribution units according to the configuration file.

2. The method according to claim 1, further comprising prompting a user of the update apparatus to initiate configuration of the one or more rack power distribution units through activation of a one-touch button prior to retrieving the configuration file.

3. The method according to claim 2, wherein the wireless protocol is used to implement a short range piconet.

4. The method according to claim 2, further comprising activating the one or more rack power distribution units; and
   ascertaining a current configuration status of the one or more rack power distribution units.

5. The method according to claim 4, further comprising notifying the user of the update apparatus that the one or more rack power distribution units have been activated, in response to activating the one or more rack power distribution units.

6. The method according to claim 5, further comprising updating the configuration file with intrinsic data, wherein the intrinsic data includes information reported by the one or more rack power distribution units.

7. The method according to claim 5, further comprising updating the configuration file at the update apparatus with user selected network data prior to transmitting the configuration file from the update apparatus to the one or more rack power distribution units via the wireless protocol, wherein updating the configuration file at the update apparatus with user selected network data includes:
   providing the user with, via the update apparatus, a list of network devices for selection; and
   retrieving user selected network data in response to user selection of a network device.

8. A system for configuring a rack power distribution unit in a data center comprising:
   an update apparatus comprising a communication interface for communication via a wireless protocol; and
   one or more components executable by the update apparatus and collectively configured to:

receive a device configuration request via the wireless protocol, in response to receiving the device configuration request, retrieve a configuration file, wherein the configuration file comprises a series of instructions for configuring a first rack power distribution unit in a default configuration, receive, via the wireless protocol, neighboring device data for neighboring rack power distribution units and update a location field of the configuration file based on a configuration history of the neighboring rack power distribution units at the update apparatus, with a machine learning process, wherein the location field includes row and rack numbers that indicate a position of the first rack power distribution unit relative to a position of the neighboring rack power distribution units; and transmit the configuration file to the first rack power distribution unit.

9. The system of claim 8, wherein the update apparatus includes a mobile computing device.

10. The system of claim 8, further comprising the first rack power distribution unit, the first rack power distribution unit including a wireless component configured to request device configuration via the wireless protocol and receive the configuration file via the wireless protocol.

11. The system of claim 8, wherein the one or more components are further collectively configured to:

update the configuration file with intrinsic data, wherein the intrinsic data includes information self-described by the first rack power distribution unit.

12. The system of claim 8, further comprising at least a second rack power distribution unit.

13. The system of claim 8, wherein the one or more components are further collectively configured to:

prompt a user of the update apparatus to initiate configuration of the first rack power distribution unit through activation of a one-touch button prior to retrieving the configuration file at the update apparatus.

14. A system including a rack power distribution unit comprising:

a unit housing;

a power input configured to receive power from an external source;

at least one power output configured to couple to a computing asset to deliver power to the computing asset; and a wireless component, wherein the wireless component is configured to:

request device configuration information via a wireless protocol, in response to activation of the rack power distribution unit, and receive a configuration file via the wireless protocol, wherein the configuration file comprises a series of instructions for configuring the rack power distribution unit to a default configuration, wherein a location field of the configuration file is updated based on a configuration history of neighboring rack power distribution units, based on a machine learning process, and wherein the location field includes row and rack numbers that indicate a position of the rack power distribution unit relative to a position of the neighboring rack power distribution units.

15. The system of claim 14, wherein the wireless component is further configured to retrieve and transmit intrinsic data in response to an intrinsic data request, wherein intrinsic data includes information self-described by the rack power distribution unit.

16. The system of claim 15, further comprising an update apparatus, wherein the wireless component is further configured to receive the configuration file via the wireless protocol from the update apparatus.

17. The system of claim 16, wherein the update apparatus further includes the machine learning process and is configured to update the configuration file with the intrinsic data and the neighboring device data.

* * * * *